United States Patent [19]
Walker

[11] 3,738,404
[45] June 12, 1973

[54] METHOD OF PRODUCING DRESSED LUMBER FROM LOGS
[76] Inventor: Willard H. Walker, 36739 Magnolia St., Newark, Calif. 94560
[22] Filed: Feb. 22, 1971
[21] Appl. No.: 117,442

[52] U.S. Cl. .............. 144/312, 144/136, 144/114, 144/39
[51] Int. Cl. ............................................. B27d 1/00
[58] Field of Search ................. 143/1, 49; 144/2 R, 144/36, 37, 39, 41, 162, 326 R, 326 A, 312, 114, 242

[56] References Cited
UNITED STATES PATENTS
3,304,971  2/1967  Pease .................................. 144/312
3,313,329  4/1967  Mitten .............................. 144/136 X
932,373    8/1909  Burns ................................ 144/39 X
3,259,157  7/1966  Runnion ............................ 144/312
3,367,377  2/1968  Mitten ................................ 144/114
2,821,220  1/1958  Nicholson ...................... 144/242 X
1,825,041  9/1931  Babare ................................ 144/39

Primary Examiner—Andrew R. Juhasz
Assistant Examiner—W. Donald Bray
Attorney—Jack W. Edward

[57] ABSTRACT

A log is shaped to form a stick, which is then planed along longitudinal surfaces so that vertical dimensions of the stick are within tolerances for each size of dressed lumber to be cut therefrom while transverse horizontal dimensions of the stick equal the sum of horizontal dimensions for sizes of dressed lumber to be cut therefrom plus an allowance for each saw cut to be made, and the planed stick is sawed longitudinally with gang planer saws to produce dressed lumber.

9 Claims, 8 Drawing Figures

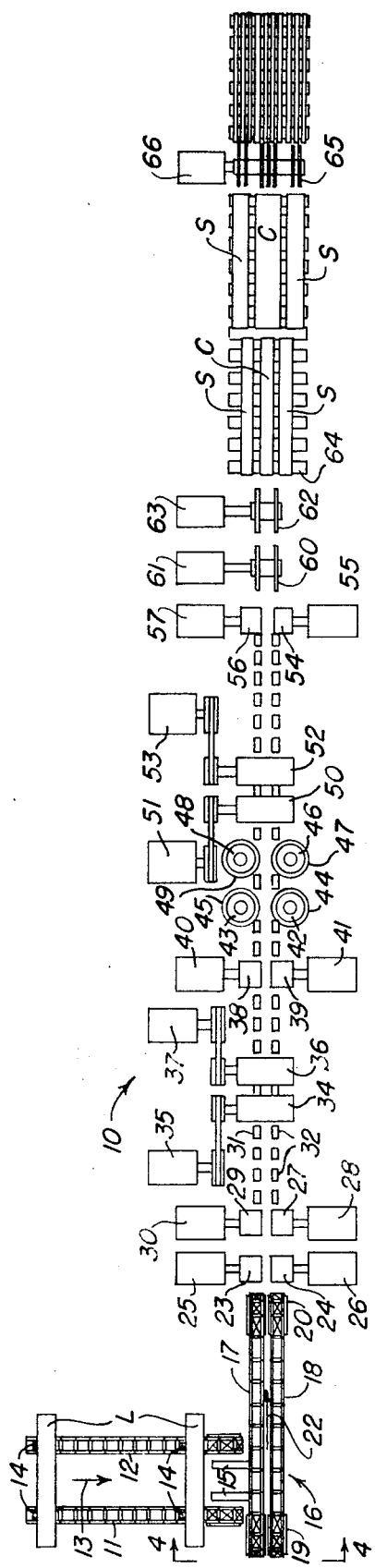
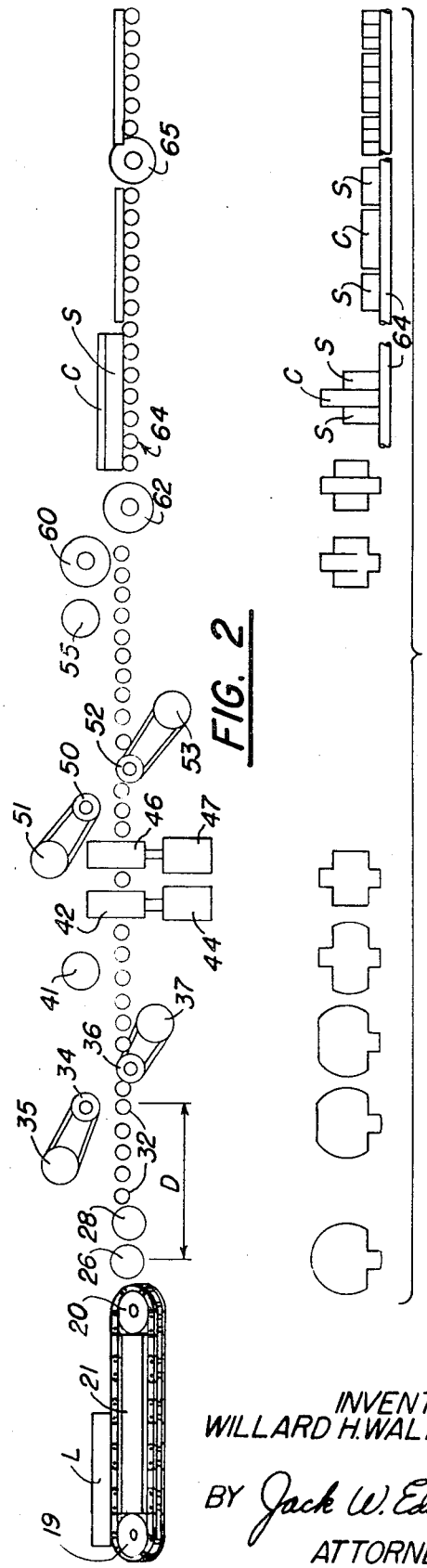

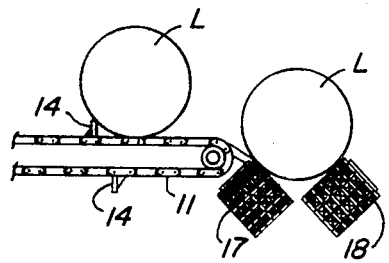
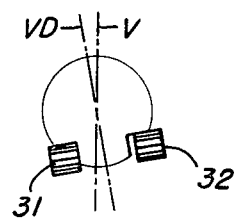
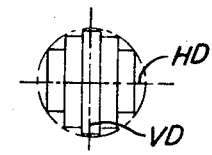
FIG. 4  FIG. 5  FIG. 6
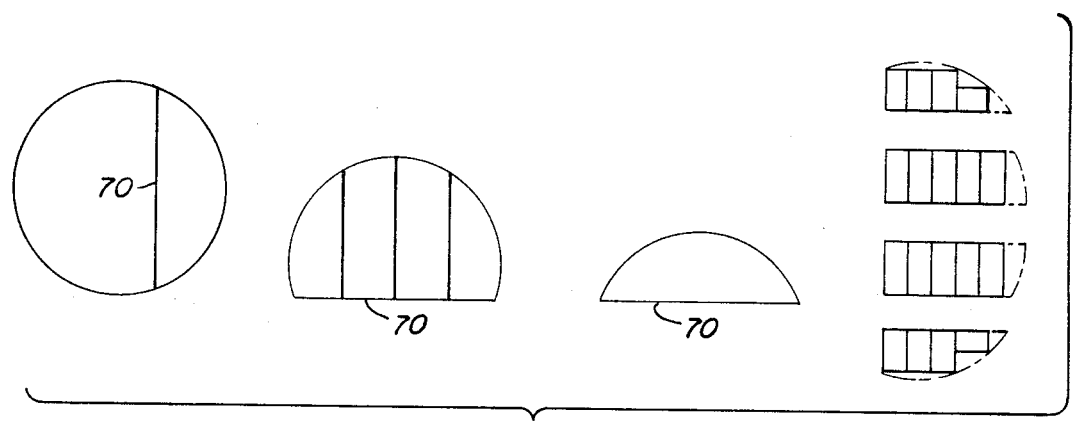
FIG. 7
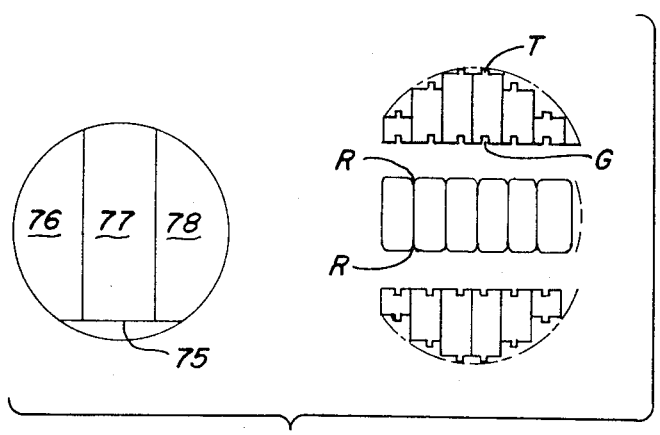
FIG. 8

METHOD OF PRODUCING DRESSED LUMBER FROM LOGS

BACKGROUND OF THE INVENTION

FIELD OF THE INVENTION

This invention relates to a method of shaping, planing and sawing logs to produce a maximum amount of dressed lumber with a minimum amount of handling.

DESCRIPTION OF THE PRIOR ART

Customary sawmill practice provides for sawing logs into rough lumber, which is then sent to a planer mill for finishing to dressed lumber size. When cutting rough lumber, an extra ⅛ of an inch is allowed on each side thereof for future size reduction in planing. Thus, for a given saw cut, an amount of wood wasted equals the width of the saw cut plus ⅛ of an inch on each side thereof which will be lost when the lumber is finished. In addition to the loss of wood, there is extra handling in gathering up the rough lumber, transporting it to a planer mill and running the rough lumber through the planer.

Logs have been chipped to a transverse profile of stepped configuration and then cut longitudinally on the planes of the riser faces with gang saws to produce rough lumber, as shown in U.S. Pat. No. 3,254,157.

U.S. Pat. No. 3,313,329 shows logs chipped to produce rectangular cants that are sawed longitudinally into rough cut studs.

SUMMARY OF THE INVENTION

Advantages of the present invention include producing a maximum amount of dressed lumber from a log with a minimum amount of handling. Longitudinal surfaces of a stick produced from the log are planed and dressed lumber is cut directly from the planed stick with gang planer saws. Since the planer saws are spaced closer than saws placed for cutting rough lumber, the amount of wood that would be wasted in planing is saved. Furthermore, the lumber is finished as it is cut by the gang planer saws and further handling for planing is avoided.

The fundamental steps of this method are shaping a stick from a log, planing the longitudinal surfaces of the stick, and sawing the planed stick longitudinally with gang planer saws to produce dressed lumber. The stick can be shaped from the log by chipping the outer surface of the log to a desired profile or by sawing the log into sections and chipping the sections to a desired profile. When planing the longitudinal surfaces of the stick, tongues and grooves can be formed and corners rounded.

BRIEF DESCRIPTION OF THE DRAWING

FIG. 1 is a diagrammatic top plan view of a sawmill for cutting logs in accordance with the present invention.

FIG. 2 is a side elevation view of the sawmill shown in FIG. 1.

FIG. 3 is a schemmatic view illustrating changes in transverse cross-section of a log as it passes various stations of the sawmill shown in FIGS. 1 and 2.

FIG. 4 is a section taken on the line 4—4 of FIG. 1.

FIG. 5 is a schemmatic view illustrating how the notched bottom of a log is guided through the sawmill.

FIG. 6 is a schemmatic view illustrating a modification of the invention wherein a log is profiled to form a stick from which various sizes of lumber is cut.

FIG. 7 is a series of schemmatic views illustrating another modification of the invention wherein a log is cut into sections and the sections chipped, planed and sawed into dressed lumber.

FIG. 8 is a series of schemmatic views illustrating a further modification of the invention wherein a log is chipped to form a guide surface, then cut into sections, which are chipped, planed and sawed into dressed lumber.

DESCRIPTION OF THE PREFERRED EMBODIMENTS

With reference to FIG. 1, logs L are fed to a sawmill 10 by a pair of parallel spaced endless roller chains 11 and 12 traveling in the direction of arrow 13. The logs extend transversely between the roller chains and are contacted by pusher dogs 14 spaced at uniform intervals along the chains. A ramp 15 is provided at the discharge end of the roller chains to support logs being transferred to a conveyor 16 aligned perpendicular thereto.

Conveyor 16 is formed by two endless roller chains 17 and 18, preferably multiple strand type such as five strand. Roller chain 18 is trained about sprocket wheels 19 and 20, as shown in FIG. 2, with the upper reach of the chain supported between sprocket wheels by a longitudinal beam 21 and roller chain 17 is similarly trained about sprocket wheels and supported by a longitudinal beam. It will be noted that upper reaches of the roller chains are transversely inclined to the horizontal with adjacent edges lowermost and outer edges uppermost forming a trough, as shown in FIG. 4. Logs discharged from roller chains 11 and 12 are centered by gravity within the trough formed by roller chains 17 and 18 and conveyed longitudinally in the direction of arrow 22 (FIG. 1) through sawmill 10.

Downstream from conveyor 16 are a pair of bottom notch chippers 23 and 24 driven by motors 25 and 26, respectively. These chippers and motors are mounted for vertical and lateral movement in a plane perpendicular to the direction of travel of logs L as indicated by arrow 22. It will be understood that suitable hold down rollers should be provided to prevent logs from moving upward while being chipped, but these have been omitted to simplify the drawing. Also, chip ducts can be provided downstream from each chipper to collect and carry away chips produced. The bottom notch chippers cut two notches from the bottom surface of a log on opposite sides of the vertical diameter, as indicated by the first sequential section in FIG. 3 which is aligned with the chippers in FIGS. 1 and 2. The run component of the right side bottom notch is finished by a planer 27 driven by a motor 28 and the left side bottom notch run component is finished by a planer 29 driven by a motor 30.

Guide rollers 31 and 32 are provided to support logs moving through the sawmill downstream from planers 27 and 28. With reference to FIG. 5, it will be seen that these guide rollers are inclined to the horizontal. Thus, guide roller 31 maintains the log in lateral alignment by contact with the corresponding bottom notch and both guide rollers provide vertical support for a moving log.

An upper chipper 34 is spaced downstream from bottom notch chippers 23 and 24 by a distance D that is greater than the length of the longest log to be run through the mill. The reason for this spacing is that it is undesireable to have a second chipper operating on a surface of the log while the bottom notches are being formed to provide a guide surface by which alignment is maintained though the mill. Upper chipper 34 is driven through a suitable drive by a motor 35 and cuts a top segment from the log as shown in the sequential section of FIG. 3 opposite the upper chipper shown in FIGS. 1 and 2.

Downstream from upper chipper 34 is a lower chipper 36 driven through a suitable drive by a motor 37. This lower chipper cuts a bottom segment from the log section as indicated in the corresponding sequential view of FIG. 3.

A pair of top notch forming chippers 38 and 39 are positioned downstream from chipper 36. Chipper 38 is driven by a motor 40 while chipper 39 is driven by a motor 41. The chippers and motors are mounted for vertical and lateral movement in a plane perpendicular to the path of travel of a log through sawmill 10. These chippers cut a pair of notches from the top portion of a log on opposite sides of the vertical centerline as shown in the corresponding sequential view of FIG. 3.

Side segment chippers 42 and 43 are positioned downstream from top notch chippers 38 and 39 on opposite sides of the path of travel of logs through sawmill 10. Chipper 42 is driven by a motor 44 and chipper 43 is driven by a motor 45. These chippers cut side segments from the log as shown in the corresponding sequential view of FIG. 3. The foregoing chippers are standard commercial items and thus have not been described in detail. Suitable chippers are manufactured by the Diston Saw Company.

A finish planer 46 driven by a motor 47 is located downstream from chipper 42 for finishing the right side of a log traveling through sawmill 10, while a corresponding finish planer 48 driven by a motor 49 is located opposite thereto for finishing the left side of the log. A finish planer 50 driven through a suitable drive by a motor 51 finishes the upper surface of the log while the bottom surface is finished by a finish planer 52 driven through a suitable drive by a motor 53. A planer 54 driven by a motor 55 finishes the run component of the right top notch and planer 56 driven by a motor 57 finishes the run component of the left top notch. The configuration of the log section remains substantially the same after planing so no additional sequential views are shown in FIG. 3.

Downstream from the finish planers are gang oversaws 60 mounted on a single hub and driven by a motor 61. Gang undersaws 62 are mounted on a single hub driven by a motor 63 at a location downstream from the gang oversaws. The oversaws and undersaws are planer saws and are spaced on the respective hubs by a dimension equal to the dressed size of lumber to be cut. The oversaws cut downward from the top notches to a depth approximately at the center of the stick shaped from the log, as shown in the corresponding sequential view of FIG. 3. which is aligned with the oversaws in FIGS. 1 and 2. The undersaws cut upward from the bottom notches through the entire cut made by the oversaws and have a thickness larger than the oversaws to produce a smooth cut. When the entire log has been cut, side portions of the stick drop down on a roller conveyor 64 downstream from gang undersaws 62, as indicated in the corresponding sequential view of FIG. 3. Gang planer saws 65 mounted on a single hub driven by a motor 66 are provided downstream of the roller conveyor for sawing out sticks of lumber laid on side into dressed lumber of a smaller size.

Before running logs L through sawmill 10, it is essential that the logs be debarked with conventional debarking equipment and pre-sorted according to size. While the sawmill can be adjusted to handle different sizes of logs, it is desireable to saw only logs of a uniform size for a given shift. Thus, it is unnecessary to stop and start the sawmill to change the set-up for handling different sized logs during the shift and the uniform sized logs can be run through the sawmill at a rapid rate in the range of between 100 and 300 feet per minute. The planer saws operate effectively only at high speed so all components of the sawmill must operate at the same rate, preferably about 200 feet per minute.

Debarked logs conveyed in the direction of arrow 12 have their sections transformed as shown in the sequential views of FIG. 3 aligned opposite the corresponding chippers and saws that make the transformation. Center stick C and side sticks S are turned to lay on one side by suitable guides positioned above roller conveyor 64. Then these sticks are cut into dressed lumber of a smaller size by gang planer saws 65.

With reference to FIG. 6, a modified form of the invention is illustrated. A log is shaped to form a stick by chipping the outer surface of the log on each side of a vertical diameter VD to a profile of stepped configuration ascending above and descending below the horizontal diameter HD. Planes of the riser faces of said ascending steps are parallel to one another and co-planar with planes of the riser faces of the descending steps. Apparatus for chipping a log in such a manner is shown in U. S. Pat. No. 3,259,157. After the log has been so profiled by the chippers, the surfaces of each riser face and run component are planed. Then the stick is cut longitudinally on the planes of the riser faces with gang planer saws spaced to produce dressed lumber.

A second modification is illustrated in FIG. 7, wherein a log is first cut by a saw into sections on a line 70. These sections are turned to rest on line 70 and the largest section is further cut into smaller sections. These sections are then passed through an auto-chip harvester, as manufactured by AUTO-CHIP CORPORATION, 2333 N.W. 98th Street, Seattle, Washington, 98107. The sections are chipped to a desired configuration of generally rectangular shape and the side surfaces of each section are planed. Each section forms a stick that is cut longitudinally by gang planer saws to produce dressed lumber.

Another modification is illustrated in FIG. 8. A segment is chipped from the bottom of a log to provide a surface along a chord line 75. Then the log is cut longitudinally on two parallel planes that intersect the chord line at right angles to form three sticks 76, 77 and 78. The sticks are then chipped to a desired configuration and the surfaces thereof are planed. It will be noted that the planer can cut longitudinal grooves G into one horizontal surface of a stick and on the horizontal surface opposite therefrom leave a projecting tongue T. Then the sticks are cut longitudinally by gang planer saws to form dressed and matched lumber. In like manner, the planer can have dado cutters that cut rounded V-shaped grooves R into the stick that serve as guides when the stick is cut by gang planer saws into dressed lumber and when so cut provide rounded corners for each piece thereof.

While preferred embodiments of the invention have been herein shown and described, it will be understood that modifications and variations can be made without departing from the scope of the appended claims.

Having thus described by invention, what I claim as new and desire to protect by Letters Patent is:

1. A method of producing dressed lumber from a log comprising the steps of shaping the log to form at least one stick from which a multiplicity of pieces of dressed lumber can be cut; planing the longitudinal surfaces of the stick so that vertical dimensions of the stick are within tolerances for the sizes of dressed lumber to be cut therefrom while transverse horizontal dimensions equal the sum of the horizontal dimensions of the sizes of dressed lumber to be cut therefrom plus an allowance for the width of every gang planar saw cut to be made; and sawing the planed stick longitudinally with gang planar saws to produce dressed lumber.

2. The method of producing dressed lumber from a log as described in claim 1 wherein the log is shaped to form a stick by chipping from the outer surface thereof two notches at the bottom of the log on opposite sides of the vertical diameter, two notches at the top of the log on opposite sides of the vertical diameter with riser faces adjacent the top notches being coplanar with riser faces adjacent the bottom notches, and segments between notches from the top, bottom and each side of the log; sawing the planed stick longitudinally on the planes of the riser faces downward from the top notches to a depth approximately at the center of the stick with a gang of planar saws located over the stick and upward from the bottom notches through the entire cut with gang planar saws located under the stick and having a blade thickness larger than the blade thickness of the gang of planar saws located over the stick so as to make a smooth cut; and including the step of laying a piece of lumber so cut on one side and sawing the piece of lumber longitudinally with gang planar saws to produce dressed lumber of a smaller sice.

3. The method of producing dressed lumber from a log as described in claim 1 wherein the log is shaped to form a stick by chipping the outer surface of the log on each side of the vertical diameter to a profile of stepped configuration ascending above and descending below the horizontal diameter of the log with riser faces of said ascending steps lying parallel to one another and being co-planar with the riser faces of the descending steps; and when the stick is sawed longitudinally with gang planer saws, the saw cuts are along the planes of the riser faces.

4. The method of producing dressed lumber from a log as described in claim 1 wherein the log is shaped to form a plurality of sticks by sawing the log longitudinally into a plurality of sections and chipping each section to a desired shape from which a multiplicity of pieces of dressed lumber can be cut.

5. The method of producing dressed lumber from a log as described in claim 1 wherein the log is shaped to form three sticks by chipping a segment from the bottom of the log; sawing the log longitudinally on two parallel planes intersecting the chord of the segment at right angles; and chipping each stick to a desired configuration before planing so that after planing a multiplicity of pieces of dressed lumber can be cut therefrom.

6. The method of producing dressed lumber from a log as described in claim 1 wherein planing the longitudinal surfaces of the stick includes cutting a longitudinal groove into one horizontal surface of the stick and cutting the horizontal surface directly opposite therefrom to leave a projecting tongue so that upon sawing the stick longitudinally, dressed and matched lumber is produced.

7. The method of producing dressed lumber from a log as described in claim 1 wherein during planing of the longitudinal surfaces of the stick, the top and bottom horizontal surfaces are cut to provide round corners for each piece of dressed lumber to be cut therefrom.

8. The method of producing dressed lumber from a log as described in claim 1 including the step of centering the log on a linear path for processing by rolling the log onto a pair of endless chains having upper surfaces that form a v-shaped trough for receiving the log therein.

9. The method of producing dressed lumber from a log as described in claim 1 including the steps of debarking logs to be processed and presorting debarked logs according to diameter size so that logs of a uniform diameter size can be used to produce dressed lumber at a given time.

* * * * *